United States Patent

Wagner

[11] 4,027,632
[45] June 7, 1977

[54] AIR INJECTION ENGINE

[76] Inventor: William Wagner, Box 366, 2nd Ave. Rte. 2, Absecon, N.J. 08201

[22] Filed: June 21, 1976

[21] Appl. No.: 698,545

[52] U.S. Cl. .......................... 123/75 RC; 123/47 R; 123/75 R
[51] Int. Cl.² .......................................... F02B 75/02
[58] Field of Search .......... 123/47 R, 47 A, 59 BS, 123/75 R, 75 B, 75 AA, 75 CC, 75 RC, 74 R; 91/24, 25, 26, 422

[56] References Cited

UNITED STATES PATENTS

| | | | |
|---|---|---|---|
| 1,436,650 | 10/1922 | Powell | 123/75 R |
| 1,594,755 | 8/1926 | Ricardo | 123/75 B |
| 1,812,566 | 6/1931 | Spencer | 123/75 CC |
| 1,906,251 | 5/1933 | Dienner | 123/75 R |
| 1,984,862 | 12/1934 | Buchlen | 123/47 A |
| 3,568,570 | 3/1971 | Winders | 91/422 |

Primary Examiner—Carroll B. Dority, Jr.
Assistant Examiner—David D. Reynolds

[57] ABSTRACT

The improvement in a combustion engine of the conventional type includes air inlet means disposed in the vicinity of an end of the cylinder facing away from the spark plug for receiving air into the cylinder, and a first plate attached to the cylinder in the vicinity of that end. The first plate is attached to the cylinder and formed with first and second openings for the cylinder and air to pass therethrough, respectively. A second plate, which fits into the cylinder is attached to the piston in the vicinity of an end portion of the latter facing the spark plug, and is formed with a third opening for passing air therethrough. Piston-and cylinder-rings slide between the first plate and the cylinder end, and between the second plate and the end portion of the piston, respectively, for a timed control of the air received into the cylinder through the air inlet means.

4 Claims, 6 Drawing Figures

AIR INJECTION ENGINE

BACKGROUND OF THE INVENTION

Field of the Invention

The field of the present invention relates to an air injection engine. Description of the Prior Art Several internal combustion engines are known which admit air under pressure and therefore require a compressed air supply to render the performance of the engine more efficient. There are also known means for introducing auxiliary air into an internal combustion engine which are rather complicated in construction.

SUMMARY OF THE INVENTION

It is, accordingly, an object of my present invention to devise means for introducing auxiliary air into a combustion engine which will render the performance of the engine more efficient and which is, at the same time, simple and inexpensive to construct.

I accordingly provide in an internal combustion engine which has a cylinder, the cylinder having first and second ends, a piston which has an end portion for movement towards and away from the second cylinder end, and wherein the piston is reciprocally movable in the cylinder, and wherein the engine has inlet means for receiving a combustible fuel mixture into the cylinder, a spark plug for igniting the combustible mixture in the cylinder under compression, and an exhaust valve for expelling the exhaust products of the ignited fuel mixture from the cylinder, and wherein the inlet means, the spark plug and the exhaust valve are mounted in the vicinity of the second end of the cylinder, the improvement which includes air inlet means disposed in the vicinity of the first end of the cylinder receiving air into the latter, a first plate attached to the cylinder in the vicinity of its first end, and wherein the first plate is formed with first and second openings for the cylinder and air to pass therethrough, respectively, a second plate attached to the piston in the vicinity of the end portion thereof, and wherein the second plate may be fitted into the cylinder and is formed with a third opening for passing air therethrough, and piston and cylinder rings slideable between the first plate and the first cylinder end, and between the second plate and the end portion of the piston, respectively, in timed relationship with the movement of the piston for a temporal control of the air received into the cylinder through the air inlet means.

Where the internal combustion engine is provided with adjustable combustion mixture throttle-means, the latter being disposed ahead of the inlet means, I provide an additional improvement which includes adjustable air throttle-means, disposed ahead of the air inlet means for regulating the air received by the latter. I additionally provide regulatable control means connected to the combustion mixture throttle-means and to the air throttle-means for coordinating the action of the combustion mixture-and air throttle-means. The piston-and cylinder-rings have piston-and cylinder-contactable surfaces, respectively, and the air inlet means and the third opening are coverable by the piston-and cylinder-rings, respectively. Each of the cylinder-contactable surface portions are formed with a recess and a synthetic plastic material may be inserted into each of the recesses.

BRIEF DESCRIPTION OF THE DRAWING

My invention will be better understood with reference to the accompanying drawing in which.

DESCRIPTION OF THE PREFERRED EMBODIMENTS

Figure 1:
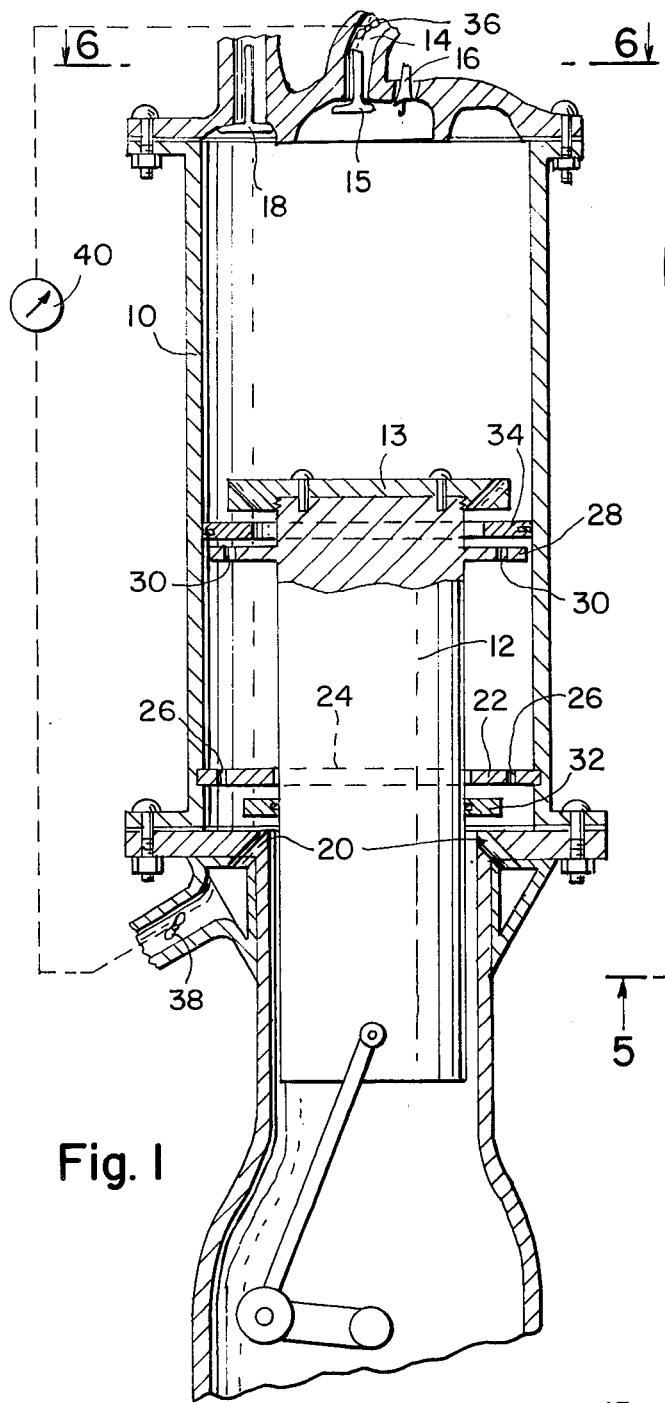
FIG. 1 shows a cross-sectional elevational view of a cylinder and piston of an internal combustion engine provided with the improvement according to my invention.
Figure 2:
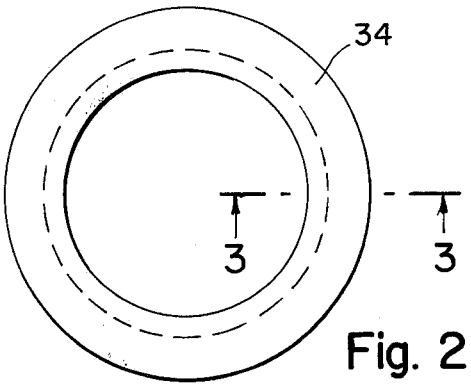
FIG. 2 is a plan view of the cylinder wall ring.
Figure 3:
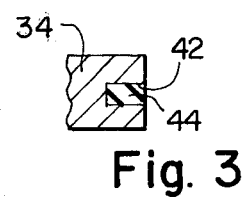
FIG. 3 is a cross-section of FIG. 2 along the lines 3—3.
Figure 4:
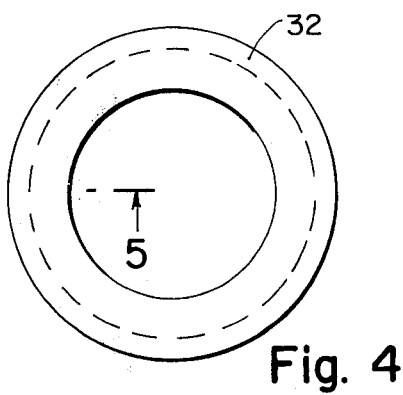
FIG. 4 is a plan view of the piston ring.
Figure 5:
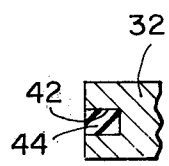
FIG. 5 is a cross-section along the lines 5—5 of FIG. 4.
Figure 6:
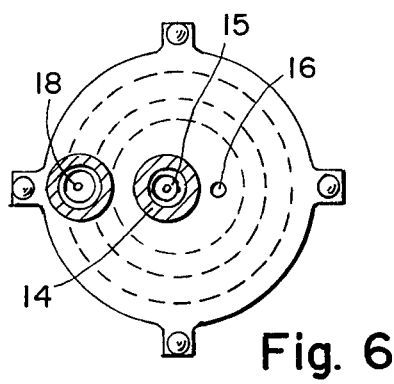
FIG. 6 is a cross-section along the lines 6—6 of FIG. 1.

Referring now to the drawing, and in particular to FIG. 1, a cylinder 10 of an internal combustion engine has a first end shown at the bottom of FIG. 1, and a second end shown at the top of FIG. 1. A piston 12 has an end portion 13 for movement towards and away from the second or top cylinder end, and the piston 12 is reciprocally movable in the cylinder 10. Inlet means 14 including a valve 15 are provided for receiving a combustible fuel mixture into the cylinder 10, a spark plug 16 serves to ignite the combustible mixture in the cylinder under compression, and an exhaust valve 18 serves to expel the exhaust products of the ignited mixture from the cylinder 10. The inlet means 14, the spark plug 16 and the exhaust valve 18 are mounted in the vicinity of the second or top end of the cylinder 10. The improvement provided by me includes air inlet means 20 disposed in the vicinity of the first or bottom end of the cylinder 10 for receiving air into the latter, a first plate 22 attached to the cylinder 10 in the vicinity of the first or bottom end thereof, and wherein the first plate 22 is formed with a fist opening 24 and a second opening 26, so that the piston 10 and air can pass through the openings 24 and 26, respectively. A second plate 28 is attached to the piston 12 in the vicinity of the end portion 13; the second plate 28 fits into the cylinder 10 and is formed with an opening 30 for passing air therethrough. A piston ring 32 and a cylinder-wall ring 34 may slide between the plate 22 and the bottom cylinder end, and between the plate 28 and the end portion 13 of the piston 12, respectively, in timed relationship with the movement of the piston 12 for a temporal control of the air received into the cylinder 10 through the air inlet means 20.

Where the internal combustion engine includes adjustable combustion mixture throttle-means 36, and where the latter is disposed ahead of the inlet means 14, I provide the additional improvement which includes adjustable air throttle-means 38 disposed ahead of the air inlet means 20 for regulating the air received by the latter.

I additionally provide regulatable control means 40 connected to the combustion mixture throttle-means 36 and to the air throttle-means 38 for coordinating the action of the combustion mixture-and air-throttle means. The piston ring 32 and the cylinder-wall ring 34 have piston-and cylinder-contactable surface portions, respectively, and the air inletmeans 20 and the third opening 30 are coverable by the piston ring 32 and wall ring 34, respectively; each of the cylinder-contactable surface portions is formed with a recess 42 and a synthetic plastic material 44 may be inserted into each of the recesses 42.

The operation of the device is as follows: At the beginning of an induction cycle, the piston 12 is at the top of its stroke, and the piston ring 32 is seated covering the air inlet openings 20; the wall ring 34 is unseated, i.e., in contact with the top portion of the cylinder 12 and permitting air to flow through the openings 30 in the plate 28. As the piston 12 moves down as the induction stroke progresses, air is expelled through the openings 30 which create a partial vacuum in the top portion of the cylinder 10, therefore draws the combustible mixture into the cylinder through the intake openings 14 and the intake valve 15, and also causes the cylinder-wall ring 34 to be unseated and the piston ring 32 to be seated, the latter covering the air inlets 20. As the piston 12 changes from the induction stroke at the bottom of its stroke to an upward compression stroke, the friction of the piston-and cylinder-rings 32 and 34 on the wall of fhe piston 12 and cylinder 10, respectively, causes the cylinder-wall ring 34 to be seated and the piston ring 32 to be unseated. At the beginning of the compression stroke, the ring chamber bounded by plates 26 and 28 has discharged all its air and is ready to fill with air again as the piston 12 moves in an upward direction. At the end of the compression stroke and at the beginning of the power stroke, the cylinder-wall ring 34 is still seated on the plate 28 and the piston ring 32 has changed its position from an unseated to a seated position, covering the air inlets 24. At the end of the power stroke, the cylinder wall ring 34 is unseated from the plate 28, the piston ring 32 is seated covering the inlets 20, the piston 12 being then at the bottom of its stroke. At that point the ring chamber has again discharged all its air and is again ready to be filled with air as the piston 12 starts to move up, and during the initial upward stroke of the exhaust portion of the cycle, the piston ring 32 again becomes unseated, and the cylinder-wall ring 34 becomes seated on the plate 28. The cylinder-wall ring 34 remains seated at the end of the exhaust stroke and the piston ring 32 stays unseated; the induction stroke then follows the exhaust stroke and the cycle repeats itself.

The aforedescribed action will make the operation of a conventional internal combustion engine more efficient; this will easily be appreciated on reflection that a conventional internal gas combustion engine does not burn its fuel up completely and causes waste and pollution of the surrounding air as a result thereof. The reason for the incomplete burn is that a gas-air mixture with adequate air to burn clean will not ignite from a spark. The mixture must thus be enriched until it does ignite; but such an enriched mixture contains too little oxygen for it to burn clean. By allowing air to enter at a second inlet 20, and by injecting the air into the cylinder 10 against a wall thereof, while a fuel mixture is drawn into the center of the cylinder from the overhead intake valve 14, the air and fuel will mix only to a certain extent. Since the incoming air is disposed next to the wall of the cylinder 10, the fuel mixture will not reach the cylinder wall immediately to condense thereon and thus eventually cause waste. If the incoming fuel mixture and the air were to be thoroughly mixed, the ensuing mixture would be too lean to ignite, but a sufficient amount of the incoming fuel mixture is left in the center of the cylinder 10 at the end of the compression stroke to allow a spark to ignite the mixture. This primary burn will cause a sufficient heat-and pressure-increase to cause the leaner mixture surrounding the center mixture to burn also, and the additional air in the surrounding lean mixture will supply the additional oxygen needed to burn the surplus fuel in the center portion of the cylinder. The efficiency of an engine, according to my invention, is further increased since there occur two cycles of air intake through the additional air intake means 20, per cycle of operation of the cylinder-piston combination. The action of the air against the cylinder wall is comparable to that of air blown on a windshield on which moisture tends to condense. Only if a warm stream of air is made to impinge on the windshield glass does the latter stay free of condensation. Similarly, air blown against the cylinder wall will keep the latter free from fuel condensation and increase the efficiency of the combustion process.

Although the invention has been described with respect to a preferred version thereof, it is to be understood that it is not to be so limited since changes can be made therein which are within the full intended scope of the appended claims.

What is claimed is:

1. In an internal combustion engine having a cylinder, the cylinder having first and second ends, a piston having an end portion for movement towards and away from the second cylinder end, the piston being reciprocally movable in the cylinder, inlet means for receiving a combustible fuel mixture into the cylinder, a spark plug for igniting the combustible mixture therein under compression, and an exhaust valve for expelling the exhaust products of the ignited fuel mixture from the cylinder, the inlet means, the spark plug and the exhaust valve being mounted in the vicinity of the second end of the cylinder, the improvement comprising:

inlet means disposed in the vicinity of the first end of the cylinder for receiving air into the latter;

a first plate attached to the cylinder in the vicinity of the first end thereof, said first plate being formed with first and second openings for the piston and air to pass therethrough, respectively;

a second plate attached to the piston in the vicinity of the end portion thereof, said second plate being fittable into the cylinder and formed with a third opening for passing air therethrough; and piston and cylinder rings slideable between said first plate and the first cylinder end, and between said second plate and said end portion of the piston, respectively, in timed relationship with the movement of the piston for a control of the air received into the cylinder through said air inlet means.

2. In an internal combustion engine according to claim 1 including adjustable combustion mixture throttle-means, the latter being disposed ahead of the inlet means, the improvement further comprising adjustable air throttle-means disposed ahead of said air inlet means for regulating the air received by the latter.

3. The improvement according to claim 2 comprising regulatable control means connected to the combustion mixture throttle-means and to said air throttle-means for coordinating the action of said combustion mixture-and air-throttle means.

4. The improvement according to claim 1 wherein said piston- and cylinder-rings have piston- and cylinder-contactable surface portions, respectively, said air inlet-means and said third opening being coverable by said piston- and cylinder-rings, respectively, and wherein each of said cylinder-contactable surface portions is formed with a recess, and further comprising synthetic plastic material insertable into each of said recesses.

* * * * *